(12) United States Patent
Weill et al.

(10) Patent No.: US 8,665,858 B2
(45) Date of Patent: Mar. 4, 2014

(54) METHOD AND COMPUTER READABLE MEDIUM FOR GATHERING USER EQUIPMENT LOCATION INFORMATION

(75) Inventors: Ofer Weill, Modi'in (IL); Nery Strasman, Ramat Gan (IL); Vijay Devarapalli, Los Altos, CA (US)

(73) Assignee: Vasona Networks Inc., Santa Clara, CA (US)

(*) Notice: Subject to any disclaimer, the term of this patent is extended or adjusted under 35 U.S.C. 154(b) by 154 days.

(21) Appl. No.: 13/426,634

(22) Filed: Mar. 22, 2012

(65) Prior Publication Data

US 2013/0072222 A1    Mar. 21, 2013

Related U.S. Application Data

(63) Continuation-in-part of application No. 13/233,043, filed on Sep. 15, 2011.

(60) Provisional application No. 61/567,194, filed on Dec. 6, 2011.

(51) Int. Cl.
*H04J 3/24* (2006.01)
(52) U.S. Cl.
USPC .......................... 370/349; 370/310.2
(58) Field of Classification Search
USPC ................. 370/349, 310.2, 328, 338
See application file for complete search history.

(56) References Cited

U.S. PATENT DOCUMENTS

| | | | |
|---|---|---|---|
| 6,385,673 B1 | 5/2002 | DeMoney | |
| 6,697,378 B1 | 2/2004 | Patel | |
| 7,016,693 B2 * | 3/2006 | Guyot | 455/456.2 |
| 7,937,092 B2 * | 5/2011 | Shim | 455/456.1 |
| 7,953,421 B2 * | 5/2011 | Duan et al. | 455/456.3 |
| 8,205,004 B1 | 6/2012 | Kaufman et al. | |
| 2003/0067872 A1 | 4/2003 | Harrell et al. | |
| 2004/0203825 A1 | 10/2004 | Daniel et al. | |
| 2005/0114538 A1 | 5/2005 | Rose | |
| 2005/0148314 A1 | 7/2005 | Taglienti et al. | |
| 2005/0204046 A1 | 9/2005 | Watanabe | |
| 2006/0293066 A1 * | 12/2006 | Edge et al. | 455/456.3 |
| 2008/0212480 A1 | 9/2008 | Shimonishi | |
| 2009/0327079 A1 | 12/2009 | Parker et al. | |
| 2010/0034089 A1 | 2/2010 | Kovvali et al. | |
| 2010/0074275 A1 | 3/2010 | Sahai | |
| 2010/0131671 A1 | 5/2010 | Kohli et al. | |
| 2010/0151899 A1 | 6/2010 | Lekutai | |
| 2010/0195602 A1 | 8/2010 | Kovvali et al. | |
| 2011/0032898 A1 | 2/2011 | Kazmi et al. | |
| 2011/0082924 A1 | 4/2011 | Gopalakrishnan | |
| 2011/0145726 A1 | 6/2011 | Wei et al. | |
| 2011/0197239 A1 | 8/2011 | Schlack | |
| 2012/0039191 A1 | 2/2012 | Foster et al. | |
| 2012/0052866 A1 | 3/2012 | Froehlich et al. | |
| 2012/0087260 A1 | 4/2012 | Devarapalli et al. | |
| 2013/0016620 A1 | 1/2013 | Den Hartog et al. | |
| 2013/0163428 A1 | 6/2013 | Lee et al. | |

* cited by examiner

*Primary Examiner* — Brenda H Pham
(74) *Attorney, Agent, or Firm* — Oren Reches

(57) ABSTRACT

A non-transitory computer readable medium and a method for gathering user equipment (UE) location information from a radio access network (RAN), the method may include: intercepting a UE location message sent from the RAN towards a core network element configured to process UE location messages, wherein the intercepting is executed by an intermediate entity positioned between the RAN and the core network element; extracting UE location information from the UE location message; and preventing the core network element from receiving the location information embedded in the UE location message.

24 Claims, 9 Drawing Sheets

METHOD AND COMPUTER READABLE MEDIUM FOR GATHERING USER EQUIPMENT LOCATION INFORMATION

RELATED APPLICATIONS

This application claims priority from U.S. provisional patent 61/567,194 filing date Dec. 6, 2011 and also is a continuation in part of U.S. patent application Ser. No. 13/233,043 filing date Sep. 15, 2011 which claims the priority of US provisional patent filing date Sep. 16, 2010, Ser. No. 61/383,414, which is incorporated herein by reference.

BACKGROUND OF THE INVENTION

Third Generation (3G) Wireless Networks 3G wireless networks may interface with external networks such as the internet. Third generation (3G) wireless networks have a General Packet Radio Service (GPRS) core network that facilitates the transmission of Internet Protocol (IP) packets between the 3G wireless network and the internet. The GPRS core network may use a GPRS tunneling protocol that allows users of the 3G wireless network to be coupled to external networks while moving from one location to the other. The GPRS may include various components such as the Service GPRS Support Node (SGSN) and Gateway GPRS Support node (GGSN). The SGSN can interface with a Radio Network Controller (RNC).

The functionality of the different 3G wireless network components is known in the art and defined in various known standards. One non-limiting explanation relating to the SGSN, the RNC and the GGSN can be found in www.wikipedia.org.

Gateway GPRS Support Node (GGSN)—The Gateway GPRS Support Node (GGSN) is a main component of the GPRS network. The GGSN is responsible for the interworking between the GPRS network and external packet switched networks, like the Internet and X.25 networks. From an external network's point of view, the GGSN is a router to a sub-network, because the GGSN 'hides' the GPRS infrastructure from the external network.

When the GGSN receives data addressed to a specific user, it checks if the user is active. If it is, the GGSN forwards the data to the SGSN serving the mobile user, but if the mobile user is inactive, the data is discarded. On the other hand, mobile-originated packets are routed to the right network by the GGSN. The GGSN is the anchor point that enables the mobility of the user terminal in the GPRS/UMTS networks. In essence, it carries out the role in GPRS equivalent to the Home Agent in Mobile IP. It maintains routing necessary to tunnel the Protocol Data Units (PDUs) to the SGSN that service a particular MS (Mobile Station).

The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN is responsible for IP address assignment and is the default router for the coupled user equipment (UE). The GGSN also performs authentication and charging functions. Other functions include subscriber screening, IP Pool management and address mapping, QoS and PDP context enforcement. With LTE scenario the GGSN functionality moves to SAE gateway (with SGSN functionality working in MME).

Serving GPRS Support Node (SGSN)—a Serving GPRS Support Node (SGSN) is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address or addresses) used in the packet data network) of all GPRS users registered with this SGSN components.

Radio Network Controller (RNC)—the RNC is a governing element in the UMTS radio access network (UTRAN) and is responsible for controlling the Node Bs that are coupled to it. The RNC carries out radio resource management, some of the mobility management functions and is the point where encryption is done before user data is sent to and from the mobile. The RNC connects to the Circuit Switched Core Network through Media Gateway (MGW) and to the SGSN (Serving GPRS Support Node) in the Packet Switched Core Network. The logical connections between the network elements are known as interfaces.

The interface between the RNC and the Circuit Switched Core Network (CS-CN) is called Iu-CS and between the RNC and the Packet Switched Core Network is called Iu-PS. Other interfaces include Iub (between the RNC and the Node B) and Iur (between RNCs in the same network). Iu interfaces carry user traffic (such as voice or data) as well as control information Iur interface is mainly needed for soft handovers involving 2 RNCs though not required as the absence of Iur will cause these handovers to become hard handovers . . . ub, Iu and Iur protocols all carry both user data and signaling (that is, control plane).

Signaling protocol responsible for the control of the Node B by the RNC is called NBAP (Node-B Application Part). NBAP is subdivided into Common and Dedicated NBAP (C-NBAP and D-NBAP), where Common NBAP controls overall Node B functionality and Dedicated NBAP controls separate cells or sectors of the Node B. NBAP is carried over Iub. In order for NBAP to handle common and dedicated procedures, it is divided into: NodeB Control Port (NCP) which handles common NBAP procedures and Communication Control Port (CCP) which handles dedicated NBAP procedures. Control plane protocol for the transport layer is called ALCAP (Access Link Control Application Protocol).

Basic functionality of ALCAP is multiplexing of different users onto one AAL2 transmission path using channel IDs (CIDs). ALCAP is carried over Iub and Iu-CS interfaces. Signaling protocol responsible for communication between RNC and the core network is called RANAP (Radio Access Network Application Part), and is carried over Iu interface. Signaling protocol responsible for communications between RNCs is called RNSAP (Radio Network Subsystem Application Part) and is carried on the Iur interface.

There is a growing need to reduce the load on core network elements such as the SGSN but oh the other hand there is a growing need to extract more information about the networks.

SUMMARY OF THE INVENTION

According to an embodiment of the invention a method may be provided for gathering user equipment (UE) location information from a radio access network (RAN), the method may include: intercepting a UE location message sent from the RAN towards a core network element configured to process UE location messages, wherein the intercepting is executed by an intermediate entity positioned between the RAN and the core network element; extracting UE location information from the UE location message; and preventing the core network element from receiving the location information embedded in the UE location message.

The network element may be an SGSN.

The method may include triggering the RAN, by the intermediate entity, generation of multiple UE location messages relating to a certain UE.

The method may include instructing the RAN to stop sending UE location messages relating to the certain UE if the certain UE is inactive during a predetermined period.

The preventing may include preventing any UE location message to arrive to the core network element.

The method may include emulating, by the intermediate entity, the core network element, to the RAN.

The method may include extracting identification information from control messages exchanged between the RAN and the core network element; and utilizing the identification information during the emulating of the core element to the RAN.

The method may include extracting at least one out of a SCTP stream identifier and a SCCP connection identifier.

The method may include utilizing a connection established between the core network element and the RAN and re-stamping transmission sequence numbers associated with the connection.

The method may include updating a status of the RAN in response to the UE location information.

The method may include allowing the core element network to receive only the first UE location message related to a certain UE out of multiple UE location information massages related to the certain UE; wherein a generation of the multiple UE location messages was triggered by the core element network.

The method may include allowing the core element network to receive only a subset of multiple UE location information massages related to the certain UE; wherein a generation of the multiple UE location messages was triggered by the core element network.

According to an embodiment of the invention a non-transitory computer readable medium may be provided and may store instructions for executing any stage or any combination of the method illustrated in the specification. For example, the non-transitory computer readable medium may store instructions for intercepting a user equipment (UE) location message sent from a radio access network (RAN) towards a core network element configured to process UE location messages, wherein the intercepting is executed by an intermediate entity positioned between the RAN and the core network element; extracting UE location information from the UE location message; and preventing the core network element from receiving the location information embedded in the UE location message.

According to an embodiment of the invention an intermediate entity may be provided and may include at least one hardware component. The intermediate entity can include an interceptor for intercepting a user equipment (UE) location message sent from a radio access network (RAN) towards a core network element configured to process UE location messages, wherein the intermediate entity may be positioned between the RAN and the core network element; the intermediate entity may also include a parser for extracting UE location information from the UE location message and a location information unit arranged to prevent the core network element from receiving the location information embedded in the UE location message. The location information unit may include the interceptor, the parser or both.

The location information unit may be arranged to trigger the RAN to generate multiple UE location messages relating to a certain UE.

The location information unit method may be arranged to instruct the RAN to stop sending UE location messages relating to the certain UE if the certain UE is inactive during a predetermined period.

The location information unit may be arranged to prevent any UE location message to arrive to the core network element.

The location information unit may be arranged to emulate the core network element to the RAN.

The interceptor may be arranged to extract identification information from control messages exchanged between the RAN and the core network element; and to utilize the identification information during the emulating of the core element to the RAN.

The parser may be arranged to extract a SCTP stream identifier, a SCCP connection identifier or both.

The location information unit may be arranged to utilize a connection established between the core network element and the RAN and re-stamp transmission sequence numbers associated with the connection.

The location information unit may be arranged to update a status of the RAN in response to the UE location information.

The location information unit may be arranged to allow the core element network to receive only the first UE location message related to a certain UE out of multiple UE location information massages related to the certain UE; wherein a generation of the multiple UE location messages was triggered by the core element network.

The location information unit may be arranged to allow the core element network to receive only a subset of multiple UE location information massages related to the certain UE; wherein a generation of the multiple UE location messages was triggered by the core element network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
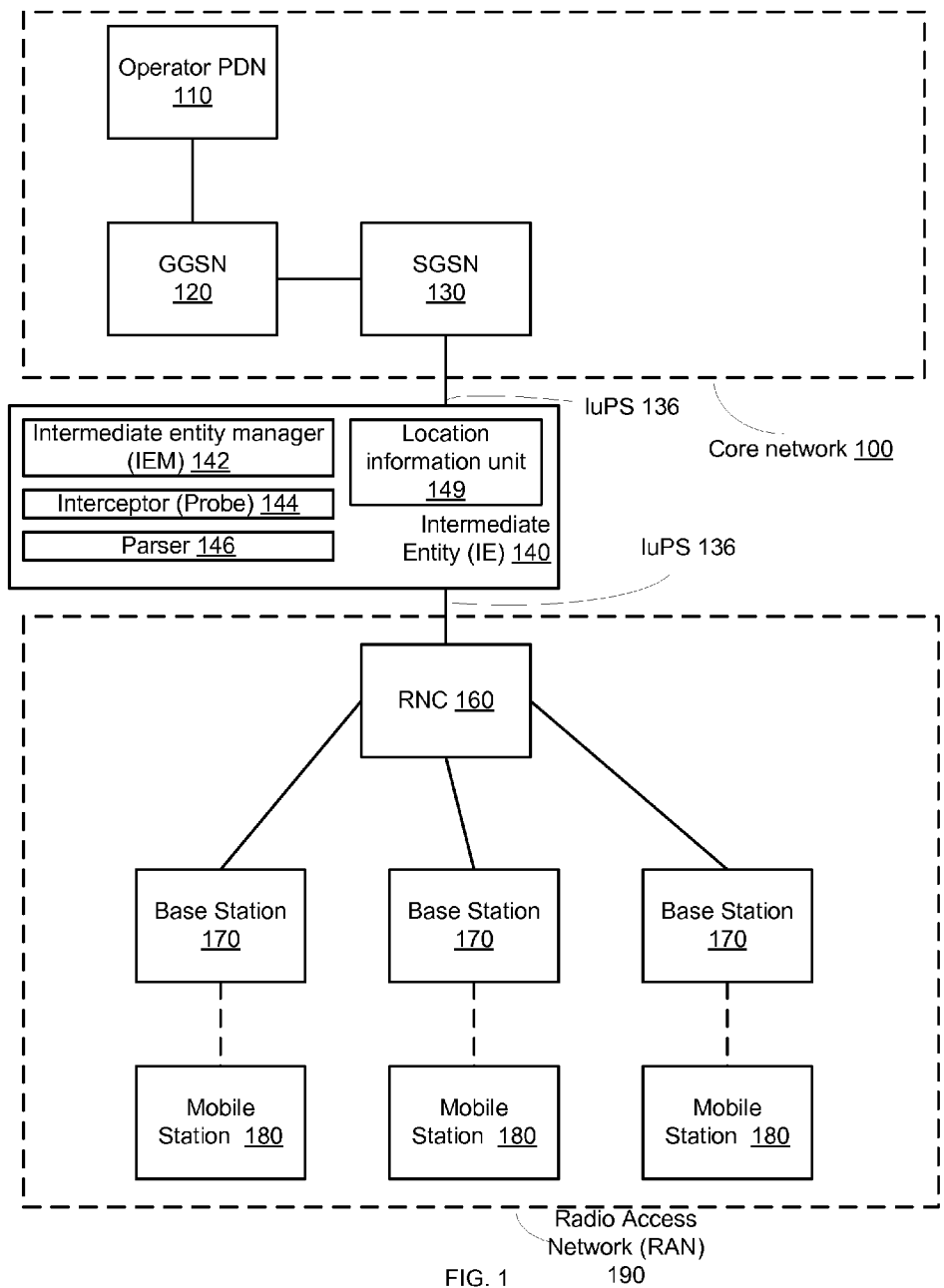
FIG. 1 illustrates a system and its environment according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "modeling" can have its regular meaning and can be interpreted as including generation of information that represents a status of an entity. The status can reflect one or a plurality of parameters and their values. A model of an entity of a Radio Access Network can change over time.

The following abbreviations are being used:
APN Access Point Name
BSC Base Station Controller
GGSN Gateway GPRS Support Node
GPRS General Packet Radio Services
GTP GPRS Tunneling Protocol
IMEI International Mobile station Equipment Identity
IMSI International Mobile Subscriber Identity
ISDN Integrated Services Digital Network
MS Mobile Station
MSISDN MS international PSTN/ISDN number
NAS Non-Access Stratum
NSAPI Network layer Service Access Point Identifier
PCF Packet Control Function
PDN Packet Data Network
PDSN Packet Data Serving Node
PSTN Public Switched Telephone network
P-TMSI Pseudo Temporary Mobile Subscriber Identity
QoS Quality of Service
RAC Routing Area Code
RAN Radio Access Network
RANAP Radio Access Network Application Part
RNC Radio Network Controller
SGSN Serving GPRS Support Node
TEID Tunnel End Point Identifier
UE User Equipment Existing optimizing solutions have not taken into account the RAN condition before applying optimization techniques. The suggested systems, computer program products and methods can accurately model a Radio Access Network wherein the modeling may include using UE location information while reducing the load on the SGSN.

By taking into account the RAN condition, it is possible to make better decisions on optimizing the data and video traffic. The right optimization tools can be used depending on whether a particular radio cell is underutilized or saturated.

The disclosed systems, computer program products and methods may not disrupt existing network elements in the core network and in the radio network. An intermediate entity (IE) such as but not limited to an Edge Bandwidth Manager (and the control plane probe) may be transparent to the existing network elements. The existing network elements do not have to be upgraded. The IE can include one or more hardware components. The IE can perform at least one of the following: enforce policies, participate in enforcement of policies, model the RAN, can obtain UE location information and process UE location information.

The system, edge bandwidth manager, method and computer program product described in this document is related to dynamically managing bandwidth in a 3G Radio network based on accurately determining the current state of the RAN.

The herein disclosed solutions involve inserting a new network element between the RAN and a core network. The new network element (hereinafter referred to as IE) conveniently parses all control plane messages between the RAN and the core network to accurately model the RAN, and determines its current state. This includes determining the current bandwidth utilization in the RAN.

According to various embodiments of the invention a system can be provided and may include a probe, arranged to parse control plane massages that are exchanged between a Radio Access Network (RAN) and a core network that is coupled to the RAN; and an Intermediate Entity arranged to determine a current state of the RAN based on the control plane massages.

According to an embodiment of the invention an Intermediate Entity is provided and may include a parser, arranged to parse control plane massages that are exchanged between the RAN and a core network that is coupled to the RAN; and an edge bandwidth management entity arranged to determine a current state of the RAN based on the control plane massages. The data plane traffic may also be taken into account to accurately model the RAN and determine the state of the RAN.

The system, edge bandwidth manager, method and computer program product described herein can accurately model a RAN network, so that any optimization solution takes into account the state of the RAN.

It is noted that the proposed systems and methods are applicable to various types of networks. In case of 3G networks, the Intermediate Entity is placed between the Radio Network Controller (RNC) and the Serving GPRS Support Node (SGSN). The interface between the RNC and the SGSN is referred to as the IuPS interface. The Intermediate Entity parses all IuPS signaling messages between the RNC and the SGSN. This includes RANAP protocol messages between the SGSN and the RNC and the NAS signaling messages between the SGSN and the end User Equipment (UE).

FIG. 1 illustrates Intermediate Entity (IE) 140, core network 100 and RAN 190 according to an embodiment of the invention.

IE 140 may include an interceptor (such as a probe) 144 for intercepting control plane messages, parser 144 for parsing the control plane messages, an edge bandwidth management module 142 for processing the control plane messages in order to evaluate to state of the RAN and a location information unit 149. IE 140 is illustrated as being coupled to IuPS 136 interfaces.

It is noted that the IE 140 may also track after user data sessions and that IE 140 can also perform various operations in response to the state of the RAN, such as congestion estimation, congestion prevention, and the like.

The IE 140 may enforce bandwidth management decisions it makes. For example, the IE 140 models the RAN, and in response to the model it can allocate a target bit rate for each application session. The IE 140 then tries to enforce the bit rate for the application session using various techniques. The technique used depends on the type of application session. The IE 140 may control the bit rate on both directions—uplink and downlink. Thus, a stream that is intended to be provided from the core network to the RAN can be compressed, delayed, statistically multiplexed with other streams before it passes towards the RAN. The same applies to streams that are sent from the RAN to the core network. Additionally or alternatively, the IE 140 can send bit rate allocation values to entities of the core network and/or to entities of the RAN and request these entities to enforce these bit rate allocation values.

The core network 100 is illustrated as including an operator PDN 110 such as the Internet or a private packet data network, GGSN 120 and SGSN 130. The GGSN 120 is coupled between the operator PDN 110 and the SGSN 130.

The RAN 190 includes a RNC 160 that is coupled to multiple base stations 170 that in turn are wirelessly coupled to mobile stations 180.

The IE 140 can be placed closer to either the SGSN 130 or the RNC 160. There is no restriction on its physical placement. Additionally, the functions of the IE 140 can be implemented within the SGSN 130 or the RNC 160.

In the case of 4G networks, the IE 140 can be placed between the eNodeB, the MME/SGW (Serving Gateway).

Intermediate entity 140 may include at least one hardware component. It may include an interceptor 142 for intercepting a user equipment (UE) location message sent from a radio access network (RAN) towards a core network element configured to process UE location messages. The intermediate entity 140 may also include a parser 144 for extracting UE location information from the UE location message and a location information unit 149 arranged to prevent the core network element from receiving the location information embedded in the UE location message. The location information unit 149 may include the interceptor, the parser or both.

The location information unit 149 may be arranged to trigger the RAN to generate multiple UE location messages relating to a certain UE.

The location information unit 149 method may be arranged to instruct the RAN to stop sending UE location messages relating to the certain UE if the certain UE is inactive during a predetermined period.

The location information unit 149 may be arranged to prevent any UE location message to arrive to the core network element.

The location information unit 149 may be arranged to emulate the core network element to the RAN.

The interceptor 142 may be arranged to extract identification information from control messages exchanged between the RAN and the core network element; and to utilize the identification information during the emulating of the core element to the RAN.

The parser 144 may be arranged to extract a SCTP stream identifier, a SCCP connection identifier or both.

The location information unit 149 may be arranged to utilize a connection established between the core network element and the RAN and re-stamp transmission sequence numbers associated with the connection.

The location information unit 149 may be arranged to update a status of the RAN in response to the UE location information.

The location information unit 149 may be arranged to allow the core element network to receive only the first UE location message related to a certain UE out of multiple UE location information massages related to the certain UE; wherein a generation of the multiple UE location messages was triggered by the core element network.

The location information unit 149 may be arranged to allow the core element network to receive only a subset of multiple UE location information massages related to the certain UE; wherein a generation of the multiple UE location messages was triggered by the core element network.

FIG. 1 illustrates in-path configurations according to two embodiments of the invention, in which all traffic between the RAN and the core network passes through the IE 140.

Figure 4:
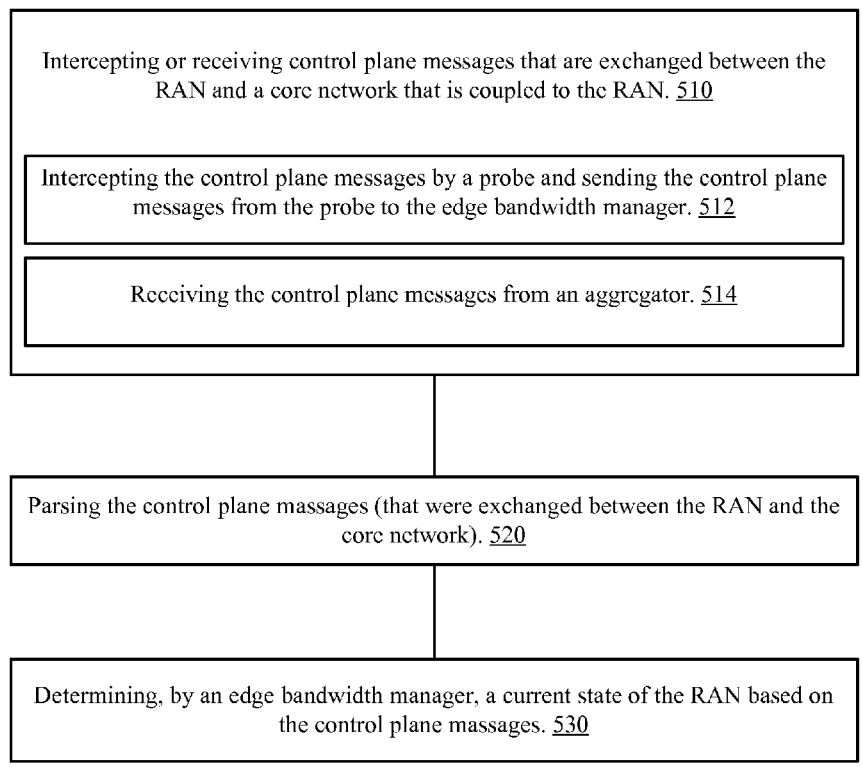
FIG. 4 illustrates a method according to an embodiment of the invention.

It is also possible to place the IE in an out-of-path mode, where the IE is co-located with an aggregation router/switch on the backhaul link. The aggregation router is configured to send specific packets (or in some cases all packets) to the Edge Bandwidth Manager. Once the IE is done with parsing the messages, they are sent back to the aggregation router and from there to the original destination. The out-of-path approach has an advantage that if the IE fails, it does not cause any impact to the rest of the network. An out-of-path approach in a 3G wireless network is shown in FIG. 4.

Figure 2:
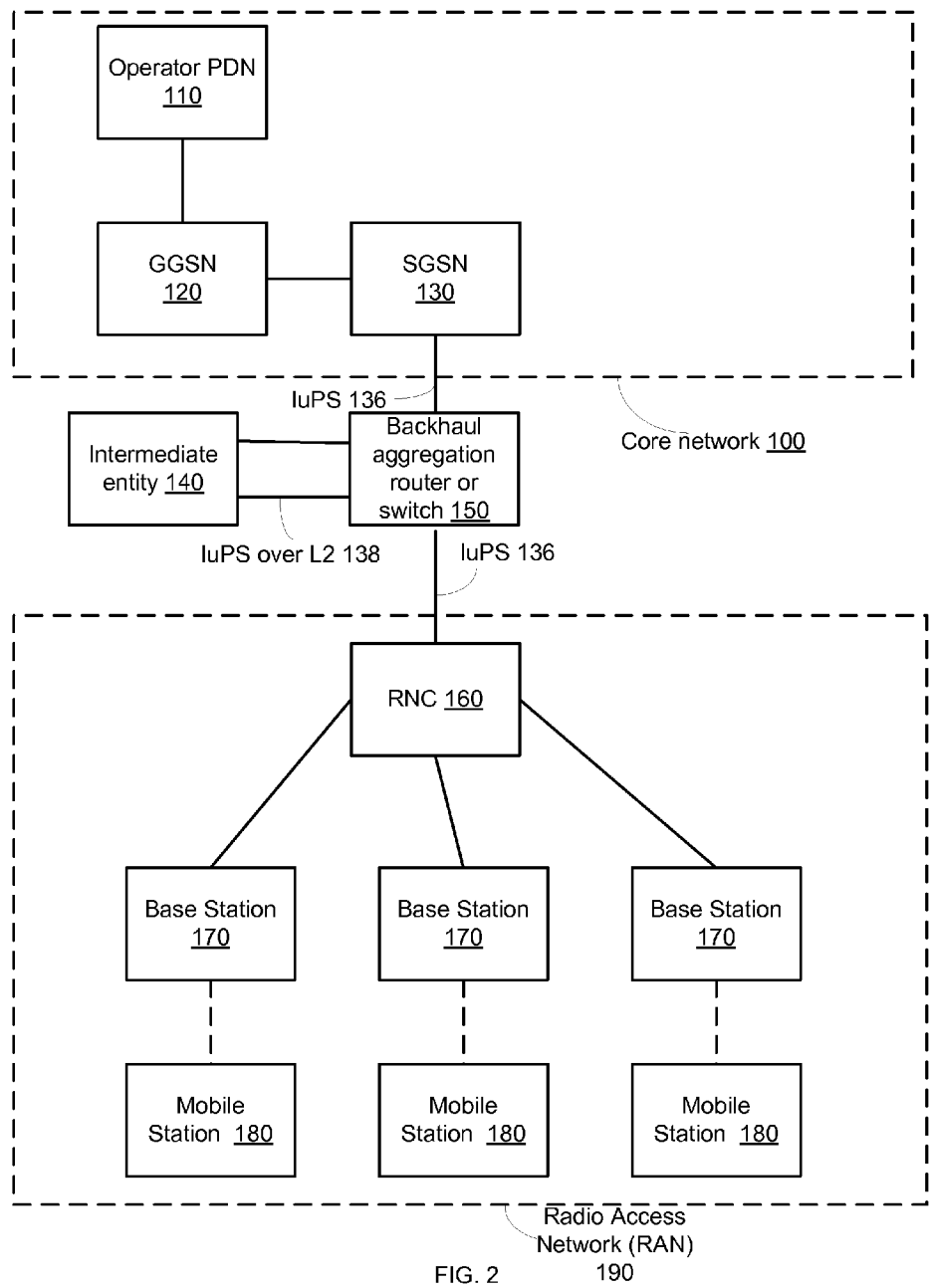
FIG. 2 illustrates a system and its environment according to an embodiment of the invention.

FIG. 2 illustrates an out-of-path approach for 3G networks, according to an embodiment of the invention. FIG. 2 differs from FIG. 1, by having a backhaul aggregator router or switch 150 coupled between the SGSN 130 and the RNC 160 (instead of the IE 140 being coupled between these elements) and having the IE 140 coupled to the backhaul aggregator router or switch 150.

The out-of-path approach can also be achieved using an Optical Bypass Switch or Network Tap.

The out-of-path configuration can also be applied to the 4G wireless network.

According to another embodiment of the invention the IE may also monitor user plane traffic, both uplink and downlink, between the RAN and the core network.

In case of 3G networks, the IE monitors the user plane traffic on the Iu-U interface between the RNC and the SGSN or between RNC and the GGSN, in case Direct Tunnel architecture is used. In case of 4G networks, the IE monitors the user plane traffic on the S1-U interface between the eNodeB and the Serving Gateway.

The IE at any time maintains an accurate picture of the RAN. On a per radio cell basis, it maintains the following information.

Cell Information: Cell ID, Routing Area Code, RNC ID, NodeB ID, Total number of Active Users, Total number of Idle Users, Total number of PDP contexts, Maximum downlink bandwidth, Maximum uplink bandwidth, Aggregate downlink bandwidth in use, and Aggregate uplink bandwidth in use.

Each piece of information described above may be obtained by parsing the relevant control plane messages and the data plane traffic. For example, in a 3G GSM network, the Cell ID is obtained from the NAS and RANAP messages exchanged on the IuPS interface. The number of active and idle users in a cell is determined based on observing state transitions for each UE in the cell. The bandwidth consumption parameters, is determined by parsing the data plane and figuring out how much bandwidth is being consumed at any point.

A per-radio cell information such as the one described above may be used by the IE to figure out how much additional capacity is available in the cell. The radio cell is also called a "Sector". Note that "Cell" and "Sector" are used interchangeably in this document.

A typical base station configuration has three sectors. Six sectors per base station are also possible. It also allows the IE to predict congestion situations and take corrective actions, thereby preventing congestion in a particular cell. In addition, the information present in the table above can be used to move certain users from a cell which is saturated to another cell that is underutilized, if the user is a location where the two cells overlap.

The per-cell information may be is constantly updated in real-time based on the mobility and other signaling between the RAN and the core network and the data traffic consumed by the users. The per-cell information listed above is not exhaustive.

The IE also maintains the user session state that may include at least some (or all) of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

Each piece of information described in the previous paragraph may be obtained by parsing the relevant control plane messages and the traffic generated by the user. For example, in a 3G GSM network, the subscriber IMSI is obtained by parsing the Attach Request NAS message from the UE to the SGSN. Another example is the APN information that is obtained from the Activate PDP Context Request NAS message sent from the UE to the SGSN.

Per-session information may be is constantly updated in real-time based on the mobility and other signaling between the RAN and the core network and the data traffic consumed by each session. The information listed above is not exhaustive.

As mentioned previously, the IE constructs per-cell and per-cell information (e.g. as described in Tables 1 and 2) by processing control and user plane traffic between the RAN and the core network.

The following describes in more details a method for constructing this information, according to an embodiment of the invention.

1. When the UE is powered on, it attaches to an SGSN. One of the first messages it sends is the Attach Request message. The subscriber identity and the location information are available in the Attach Request Message.
2. There are subsequent Identity Request and Check procedures, where the subscriber's actual IMSI and the IMEI information is obtained.
3. The session information is obtained when the subscriber sets up a session using the Activate PDP context procedure. This information obtained includes, the user's APN, NSAPI, requested QoS, UE IP address, and etc., 4. The tunnel information for the GTP tunnel between the RNC and the SGSN is obtained by parsing the RANAP messages related to the RAB Assignment procedure. These messages are exchanged between the RNC and the SGSN.
5. The IE also parses messages related to the UE detaching or tearing down a session.

As users move around in the radio network, the IE keeps track of which cell each user is at any time, so that it knows accurately how many users are in a particular radio cell.

The following describes how the IE keeps track of mobility related information, according to an embodiment of the invention:

1. When the UE is about to move into a new routing area (tracking area in case of 4G networks), the IE parses all messages related to routing area update procedure. This allows the IE to figure out which cell the user is moving in to at any time. This also allows the IE to keep track of the current cell the UE is in at any time.
2. When the UE is about to move in to a new location that results in a change of RNC, the IE parses all inter-RNC handover messages. This allows the IE to get updated GTP tunnel information and information exchanged between the source RNC and the target RNC.
3. The IE also parses handover messages related to inter-NodeB handovers, so that it has the current routing area and cell information.
4. The IE also processes all messages related to location reporting between the RNC and the SGSN.

In addition to processing the control plane messages, the IE may also monitor how much data traffic (both downlink and uplink) is being sent/consumed by each user on the user plane. By mapping each user's session to a cell, and the downlink and uplink bandwidth associated with each session, the Edge Bandwidth Managers computes the aggregate bandwidth that is being consumed at any time for each cell.

The maximum bandwidth available per cell is configured on the IE on a per-cell basis. There are a couple of alternate options instead of having to configure the IE on a per-cell basis. In the first option, the IE obtains this information from a central database through LDAP or similar mechanism. The central database has information on how much total bandwidth is available per cell. In the second option, the IE obtains information about the base station, more specifically what frequency it is configured with, how many antennas are installed, etc., and then figures out the total bandwidth available on the cell based on the base station information. The frequency range, and the antenna configuration are used by the IE to figure out the maximum bandwidth available per cell. Based on the total bandwidth available in a cell and the current bandwidth consumption in the cell, the IE figures out if a particular cell is saturated or underutilized.

By looking at the mobility patterns, the IE is also able to predict congestion in a cell before it happens. For example, when it sees a number of users being handed over from one cell to another, it can predict the impact on the target cell before the users move to the target cell. Based on the impact to the target cell, the IE can start taking corrective actions before the handover event happens. This allows the IE to predict congestion and prevent it before it happens in any particular cell. Another example is based on idle to active mode transitions. When the IE sees a user or a number of users transitioning from the idle to active mode, it can predict the impact of the new sessions on the cell and start taking corrective actions if it predicts congestion on the cell.

The solution described in this document does not restrict the placement of the IE. The IE functionality can be split into a plurality (for example—two) network elements, where the main bandwidth management and RAN assessment function (such as the edge bandwidth management module 142 of FIG. 1) may be centrally located and a control plane probe 144 that monitors RAN related signaling is placed much closer to/or in the radio network. For example, the IE function can be placed between the GGSN and the operator.

Figure 3:
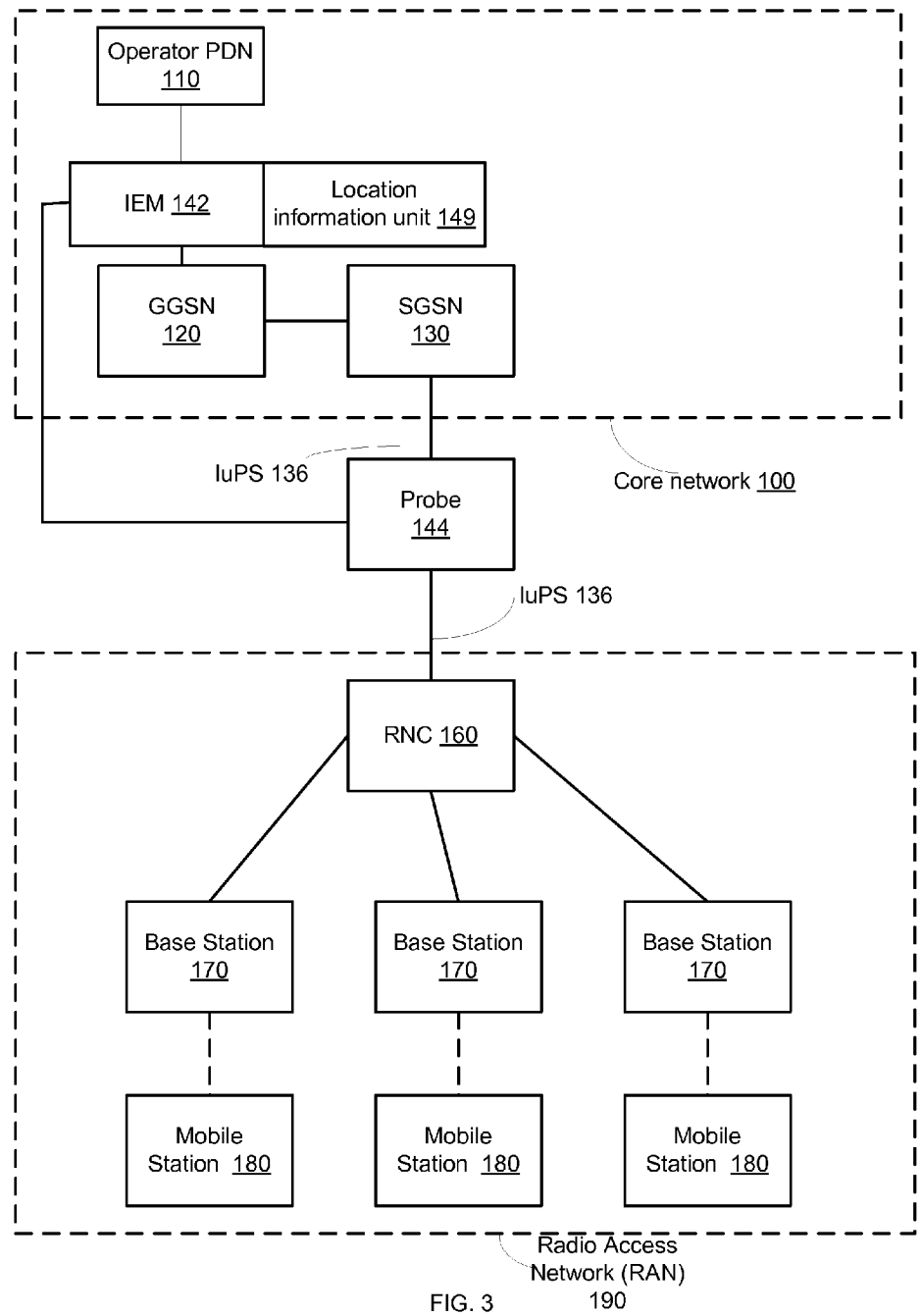
FIG. 3 illustrates a system and its environment according to an embodiment of the invention.

The Gi interface can be used for forwarding packets to external networks, including the Internet. The control plane probe 144 can be placed on the interface between the RAN and the core network—as illustrated in FIG. 3. FIG. 3 illustrates an edge bandwidth management module 142 and the location information unit are being coupled between the operator PDN 110 and the GGSN 120, while the probe 144 is coupled between the SGSN 130 and the RNC 160.

According to such an embodiment of the invention, the control plane probe 144 parses all signaling messages between the RAN 190 and the core network and provides a summary of the RAN conditions to the Edge Bandwidth Management module 142. It is also possible for the control plane probe to just forward a copy of all control plane messages to the Edge Bandwidth Management module 142. In this case, the control plane messages are actually processed on the Edge Bandwidth Management module to model the RAN 190. The control plane probe 144 does not process these messages. In case of 4G networks, the IE is placed on the SGi interface between the PGW and the operator services/Internet with the control plane probe on the S1 interface.

When the control plane is placed on the interface between the RAN and the core network, it can be placed either close to the core network nodes like the SGSN, SGW or MME or closer to the RAN network. It can also be placed inside the RAN network between the base stations and the RNC.

The control plane probe shown in FIG. 2 can be also co-located with existing network elements like the MME, the SGSN or the RNC. Then it becomes a software function on the existing network elements.

FIG. 4 illustrates method 500 according to an embodiment of the invention. Method 500 is for evaluating a state of a radio access network (RAN).

Method 500 may start by stage 510 of intercepting or receiving control plane messages that are exchanged between the RAN and a core network that is coupled to the RAN.

Stage 510 may include intercepting the control plane messages or receiving the control messages from another entity (such as an aggregator or a probe) that intercepts the control plane messages. The intercepting is done in a non-intrusive manner in the sense that the control plane messages arrive to their intended destination without being changed.

This is partially illustrated by stages 512 and 514. Stage 512 includes intercepting the control plane messages by a probe and sending the control plane messages from the probe to the edge bandwidth manager. The probe can be included in the edge bandwidth manager, located at the same location, positioned in a remote location, and the like.

Stage 514 includes receiving the control plane messages from an aggregator.

The core network can be a General Packet Radio Service (GPRS) network. Stage 510 may include intercepting control plane messages that are exchanged between a radio network controller (RNC) that is arranged to control the RAN and a Service GPRS Support Node (SGSN).

The core network can be a Serving Gateway (SGW) and a Mobility Management Entity (MME), wherein the RAN comprises an enhanced node B (eNodeB). Stage 510 may include intercepting control plane messages that are exchanged between the eNodeB and either one of the SGW and the MME.

Stage 510 is followed by stage 520 of parsing the control plane massages (that were exchanged between the RAN and the core network).

Stage 520 is followed by stage 530 of determining, by an edge bandwidth manager, a current state of the RAN based on the control plane massages.

Figure 7:
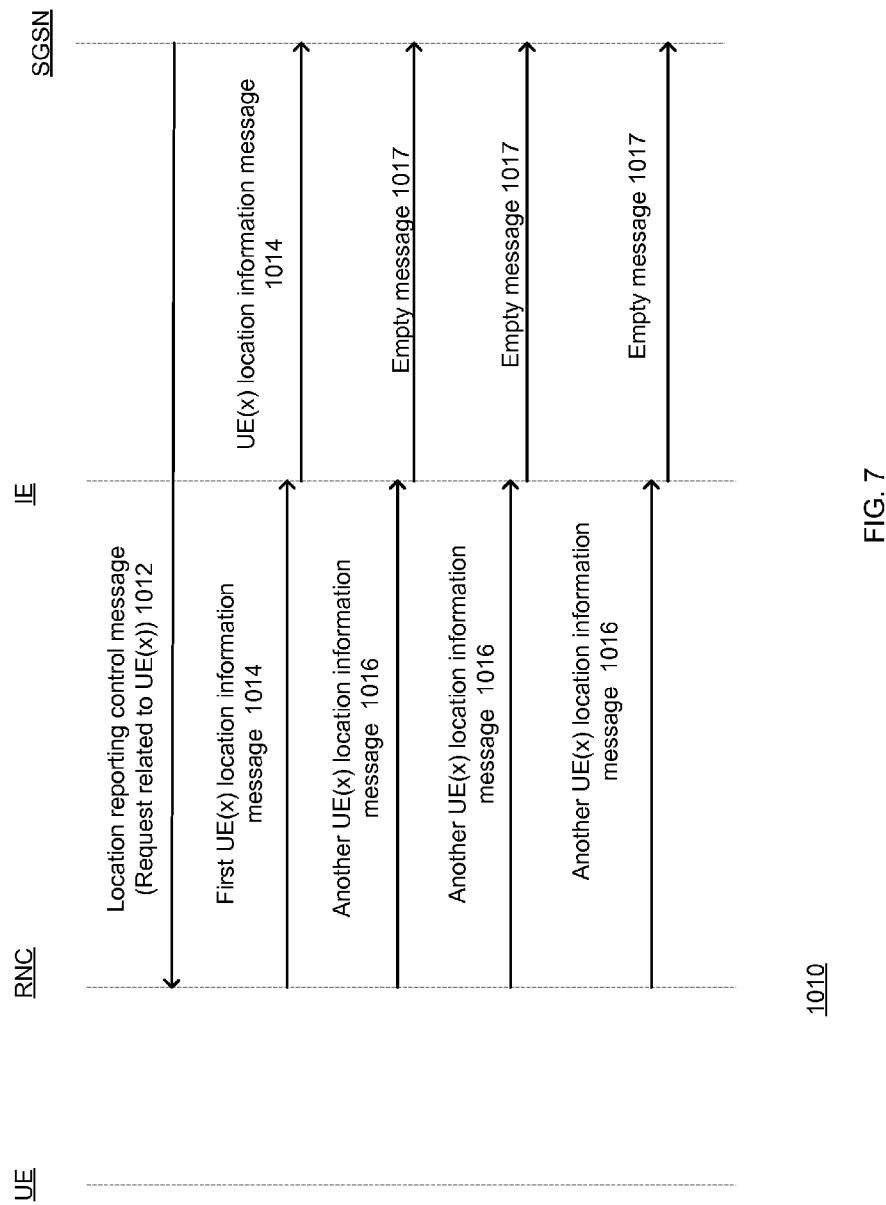
FIG. 7 is a timing diagram according to an embodiment of the invention.

FIG. 7 illustrates method 600 according to an embodiment of the invention. Method 600 is for evaluating a state of a radio access network (RAN).

Method 600 may start by stages 510 and 610. Stage 510 may include intercepting or receiving control plane messages that are exchanged between the RAN and a core network that is coupled to the RAN.

Stage 610 may include monitoring user plane traffic that is exchanged between the RAN and the core network.

Stages 510 and 610 are followed by stage 520 of parsing the control plane massages (that were exchanged between the RAN and the core network).

Stage 520 is followed by stage 630 of determining, by an edge bandwidth manager, a current state of the RAN based on the control plane massages and the user plane traffic.

Stage 630 may include stage 631 of determining bandwidth utilization in the RAN.

Stage 631 may include determining the aggregate bandwidth, the available bandwidth or any bandwidth statistics per RAN, per cell, per session, per a group of users and the like.

Stage 630 may include stage 632 of estimating a maximal capacity of a cell based on frequency and hardware information.

Stage 630 may include stage 633 of determining of the current state of the RAN comprises determining, about at least one cell of the RAN, a plurality (for example—at least four parameters) of the following parameters: Cell ID, Routing Area Code, RNC ID, NodeB ID, Total number of Active Users, Total number of Idle Users, Total number of PDP contexts, Maximum downlink bandwidth, Maximum uplink bandwidth, Aggregate downlink bandwidth in use, and Aggregate uplink bandwidth in use.

Stage 630 may include stage 634 of determining, about at least one session of at least one user of the RAN, a plurality (for example—at least four) parameters of the following parameters: IMSI/P-TMSI, IMEI, UE IP Address, IuPS/S1 GTP Tunnel information, APN, NSAPI Location Information, Negotiated QoS, MSISDN, Aggregate downlink bandwidth in use, and Aggregate uplink bandwidth in use Stage 630 may include stage 635 of detecting a potential congestion situation.

Stage 635 may be followed by stage 640 of re-allocating a user between cells in response to a detection of the potential congestion situation or assisting in the re-allocating of such user. The re-allocating can include requesting a RAN entity (such as a controller) to perform the re-allocation.

According to an embodiment of the invention a computer program product is provided. The computer program product includes a non-transitory computer readable medium that may store instructions for parsing control plane massages that are exchanged between a Radio Access Network (RAN) and a core network that is coupled to the RAN; and determining, by an edge bandwidth manager, a current state of the RAN based on the control plane massages.

The non-transitory computer readable medium may store instructions for at least one of the following:

1. Determining bandwidth utilization in the RAN.

2. Intercepting the control plane messages by a probe and sending the control plane messages from the probe to the edge bandwidth manager.
3. Receiving the control plane messages from an aggregator.
4. Monitoring user plane traffic that is exchanged between the RAN and the core network.
5. Determining, based on the control plane massages and the user traffic plane, a bandwidth utilization of a cell of the RAN.
6. Evaluating an available bandwidth of a cell of the RAN.
7. Detecting a potential congestion situation.
8. Re-allocating a user between cells in response to a detection of the potential congestion situation.
9. Estimating a maximal capacity of a cell based on frequency and hardware information.
10. Determining, about at least one cell of the RAN, multiple (for example—at least four) parameters of the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.
11. Determining, about at least one session of at least one user of the RAN, at least four parameters of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

The core network can be a General Packet Radio Service (GPRS) network and the non-transitory computer readable medium can store instructions for intercepting control plane messages that are exchanged between a radio network controller (RNC) that is arranged to control the RAN and a Service GPRS Support Node (SGSN).

The core network can be a Serving Gateway (SGW) and a Mobility Management Entity (MME), the RAN comprises an enhanced node B (eNodeB). The non-transitory computer readable medium can store instructions for intercepting control plane messages that are exchanged between the eNodeB and either one of the SGW and the MME.

Figure 5:
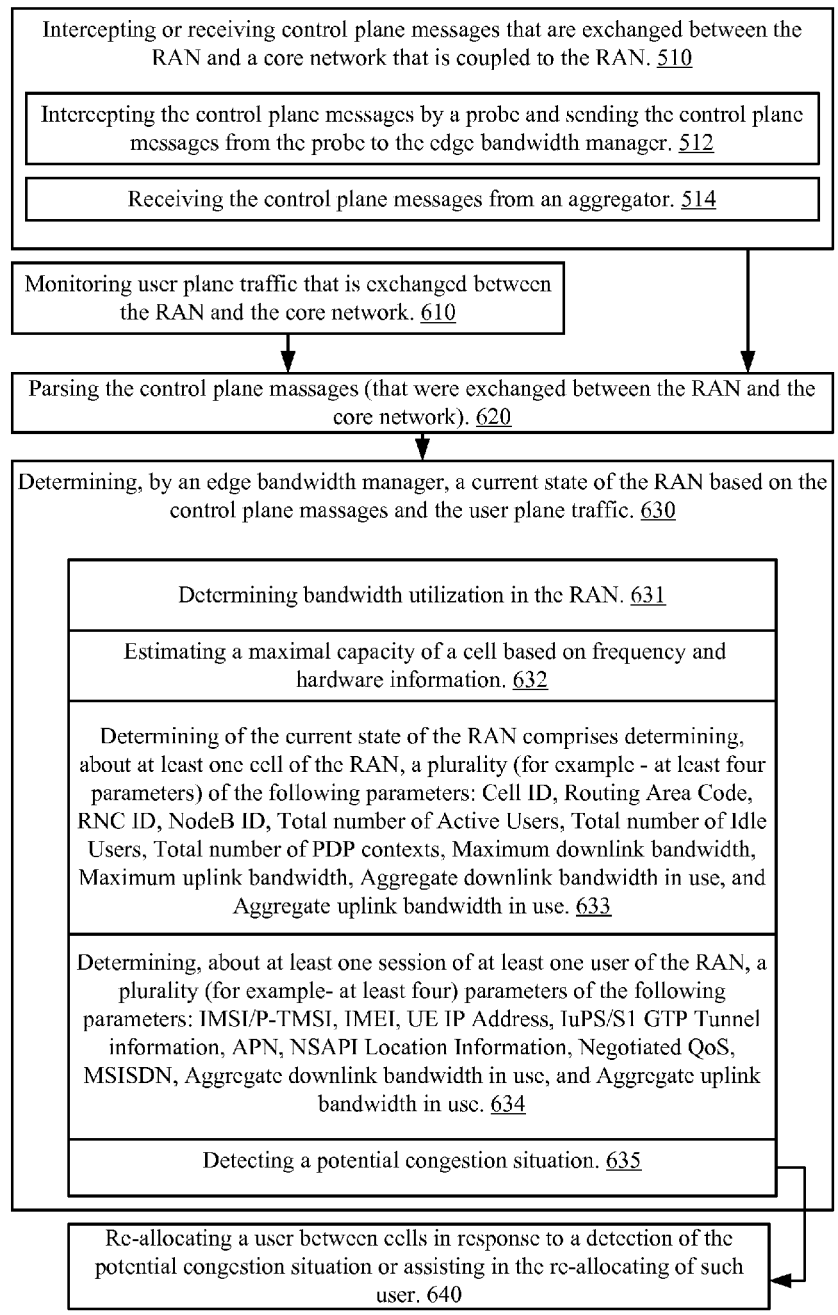
FIG. 5 illustrates a method according to an embodiment of the invention.

FIG. 5 illustrates the IE 140 as being placed on the A10/A11 interface between the PCF 716 and the PDSN 714. The IE 140 may parse all the A11 control plane messages exchanged between the PCF 716 and the PDSN 714 to model the RAN that includes the BSC 718 and the base stations controlled by the BSC.

According to an embodiment of the IE can track UEs handovers between cells of the RAN under the same RNC.

Location Reports can be generated from the RNC for specific UE when the UE moves between cells in different service-areas. The assumption is that service-area is small enough and contains single cell/sector.

The SGSN should request the RNC to generate Location Reports by sending Location-Reporting-Control message for specific UE to the RNC. The request message contains the definition of the trigger for the RNC to generate the Location Reports. In our case the trigger should be change of service-area.

In some deployments, the SGSN may already be configured to generate Location-Reporting-Control message for each UE when the UE attach the network. In this case the IE will just monitor the Location-Reports that are generated from the RNCs and use them to track the UEs location. The IE does not have to send a Location Reporting Control message to the RNC.

The Location Reports Proxy feature in the IE minimizes this overhead from both the RNCs and the SGSN. This feature should be used if and only if the IE is the only consumer of these reports. If Location Reports are used for different purposes than there is no need to turn on the Location Reports Proxy feature on the IE.

Two implementation options of the Location Reporting Proxy are described in this document—one option is less intrusive but the signaling optimization is minimal while the other option is more intrusive but the signaling optimization is maximized.

It is assumed that the IE is configured with the Service Area to Cell ID mapping. This is required because the RAN modeling at the IE is done on a per cell basis. The Cell ID that the UE is attached to is obtained when the UE performs a network attach or activates a PDP context. Once the UE is active, the UE movements are tracked on a service area granularity using the Location Reports from the RNC.

The IE may be deployed between the RNCs and the SGSN on the IuPS network.

The IE may monitor the IuPS control plane messages to map each UE to the cell it is attached to.

Location Reports are generated by the RNCs for UEs that the SGSN specifically request to get reports for them. The SGSN generates Location-Reporting-Control message to the RNC to request for Location Reports. The request includes a definition of the trigger for the report which can be immediate-report or on event of service-area change. In our case the request should be on event of service-area change.

The exact definition of the Location-Reporting-Control message can be found in: "3GPP TS 25.413-UTRAN Iu interface RANAP signaling" specification section 8.19 called "Location Reporting Control" which is incorporated herein by reference.

The exact definition of the Location-Report message can be found in: "3GPP TS 25.413-UTRAN Iu interface RANAP signaling" specification section 8.20 called "Location Reporting" which is incorporated herein by reference.

Location Reports Proxy—Implementation Options

For the RNC to generate Location-Reports it should get a control message from the SGSN for each UE separately. The control message is sent in the SCCP context of the UE.

After the RNC gets the Location-Reporting-Control message from the SGSN it will generate Location-Report for this UE when the service-area changes. The IE will process the Location-Report and update the mapping of the UE to the right cell.

The signaling overhead due to the location reports affects both the RNCs that should generate the Location-Report and the SGSN that should process the reports. It is required to minimize as much as possible the signaling overhead and that is the main goal of the Location Reports Proxy.

It should be noted that both Location-Reporting-Control and the Location-Report messages are RANAP messages which are sent over SCTP protocol. SCTP is a reliable transport protocol similar to TCP which contains sequencing and acknowledgments messages. Any intervention in the locations messages should sync the SCTP protocol.

Two implementation options for the proxy are implemented:
1. Location Reports Elimination (see, for example FIGS. 7 and 9)—in this option the SGSN is configured to request Location Reports for all the UEs from the RNC. The IE removes the Location Reports from the SCTP messages sent from the RNC to the SGSN in order to reduce the signaling overhead from the SGSN.

Location Reports Transparent Proxy—(see, for example, FIGS. 6 and 8) in this option the IE acts as transparent proxy for location reports—it generates Location-Reporting-Control message on behalf of the SGSN and drops the Location-Reports before they reach the SGSN. The IE acts also as transparent proxy in the SCTP level and adapt the sequencing numbers and the acknowledgment messages accordingly.

As it was mentioned before—if the Location-Reports are required for other services, and the SGSN is already configured to request these reports, the IE just tracks the reports to map the UEs. In this case the proxy feature is not required.

Location Reports Elimination

In the Location Reporting Elimination option the SGSN is configured to request Location-Reports for all the UEs.

When UE attaches to the network the SGSN generates Location-Reporting-Control message to the RNC and requests for Location Reports on event of service-area change. IE does nothing in this procedure.

On service area change—the RNC generates Location-Report for the UE. The IE gets the Location-Report and updates the mapping of the UE. Then, IE removes the location-report information and replaces it to SCTP with empty DATA chunk. This is illustrated in the table below:

| Incoming location report | Empty data chunk |
|---|---|
| RANAP field | — |
| SCCP field | — |
| M3UE field | — |
| SCTP field | Empty SCTP field |

The assumption is that the SGSN will ignore this message instead of the standard processing of Location-Report that should be done in the UE context. This will help in reducing the signaling load on the SGSN. Note that the first Location Report from the RNC to the SGSN is not eliminated and is forwarded untouched to the SGSN, since the first Location Report is considered as an Acknowledgement to the Location Reporting Control message.

This option is less intrusive from the IE perspective and as a result on failure of the IE the only impact to the network would be that the SGSN will start to receive Location Reports.

On the other hand this option requires configuration of the SGSN to generate Location-Reporting-Control messages for all the UEs. There is no option to play with the reports trigger and thus it implies signaling overhead on the RNC. There is also some signaling overhead on the SGSN that receives the empty SCTP chunks.

Location Reports Transparent Proxy

In Location Reports Transparent Proxy the IE acts as transparent proxy for location reports—it generates Location-Reporting-Control message on behalf of the SGSN and drops the Location-Reports before they reach the SGSN. The SGSN in not aware that Location Reports are used in the network.

The trigger to generate Location-Reporting-Control message to the RNC that will cause generation of Location-Reports for specific UE will set to minimize the signaling overhead on the RNCs. The trigger may be an acceptance of Attach-Accept message but in the product it will based on data-plane activity. The IE will trigger Location Reports only for active UEs that generate data traffic.

The IE will also stop Location Reports by sending a Location Reporting Control message to the RNC if it sees no data activity from the user for 5 minutes or for another predefined period. Yet the stop can be initiated when the US switched to an idle mode. This would be configurable on the IE. This is done so that the RNC does not have to send Location Reports for UEs that are not sending/receiving traffic actively.

In order to inject Location-Reporting-Control messages on behalf of the SGSN, and since the IE drops the Location Reports before they reach the SGSN, the IE should act as transparent proxy in the SCTP level.

The main advantages of this option are:
1. Zero impact on the SGSN that is not aware to the Location Reports
2. Minimal impact on the RNC that generates Location Reports just for the active UEs Still the IE acts in this option as transparent-proxy and as a result failure of the IE will cause reset of the SCTP connection between the SGSN and the RNCs. When this happens, the RNC and the SGSN abort the existing SCTP connection and setup one again immediately. There is only one SCTP connection on the IuPS interface between the RNC and the SGSN. If it gets aborted for any reason, it is setup again immediately.

SCTP Stream Identifiers

An SCTP transport connection can carry traffic related to multiple streams. A unique stream identifier identifies each stream. For inserting Location Reporting Control message in an existing SCTP connection, the IE picks the same stream identifier that was used in the RANAP message that carries the Attach Accept NAS message from the SGSN to the RNC.

SCCP Connection Identifier

For each control plane session on the IuPS interface, the RNC and the SGSN assign unique SCCP connection identifiers called the Source Local Reference and the Destination Location Reference. Any control plane message related to a particular UE needs to be sent on the same SCCP connection already negotiated. The IE stores the SCCP connection identifiers when the UE performs initial Network Attach. When the IE sends the Location Reporting Control message to the RNC, it uses the right SCCP Destination Location Reference that is stored as part of the UE state.

SCTP Transmission Sequence Numbers

When the IE inserts packets into the existing SCTP connection between the RNC and the SGSN, the Transmission Sequence Numbers (TSB) go out of order. To make sure the RNC and the SGSN see consistent TSNs, the IE updates the TSNs in the SCTP data chunks and in the SACK control chunks in both directions. This allows the IE to stay transparent in an existing SCTP connection.

Figure 6:
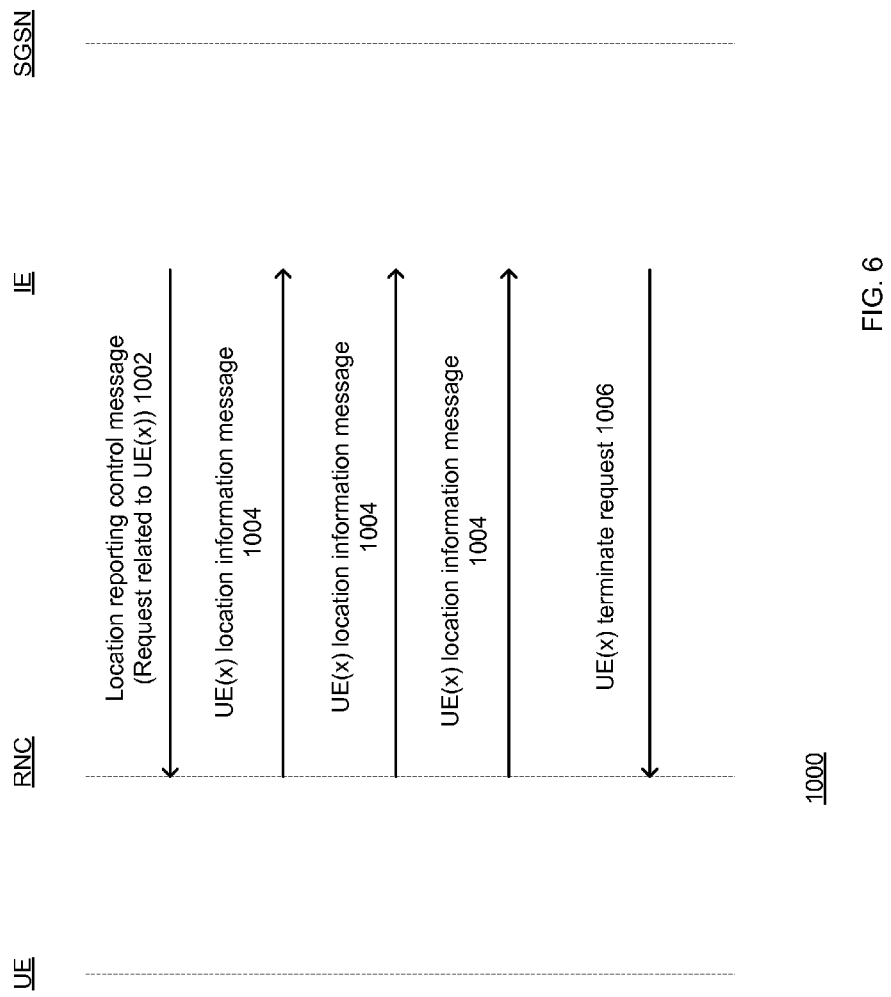
FIG. 6 is a timing diagram according to an embodiment of the invention.

FIG. 6 is a timing diagram 1000 illustrating a location reports transparent proxy scenario according to an embodiment of the invention.

The timing diagram 1000 illustrates a trigger 1002 sent from the IE to the RNC for receiving UE location messages relating to a certain UE (denoted UE(x)), multiple UE location messages relating to UE(x) 1004 sent from the RNC, and a request (UE(x) terminate request 1006) from the IE to the RNC to terminate the sending of the UE(x) location messages. This stops the transmission from the RAN of the UE(x) location messages 1004.

FIG. 7 is a timing diagram 1010 illustrating a location reports elimination scenario according to an embodiment of the invention.

The timing diagram 1010 illustrates a trigger 1012 sent from the SGSN to the RNC for receiving UE location messages relating to a certain UE (denoted UE(x)), a first UE(x) location message 1014, additional UE(x) location messages 1016 sent from the RNC and reach the IE that converts them to empty messages 1017 that are ignored by SGSN.

Figure 8:
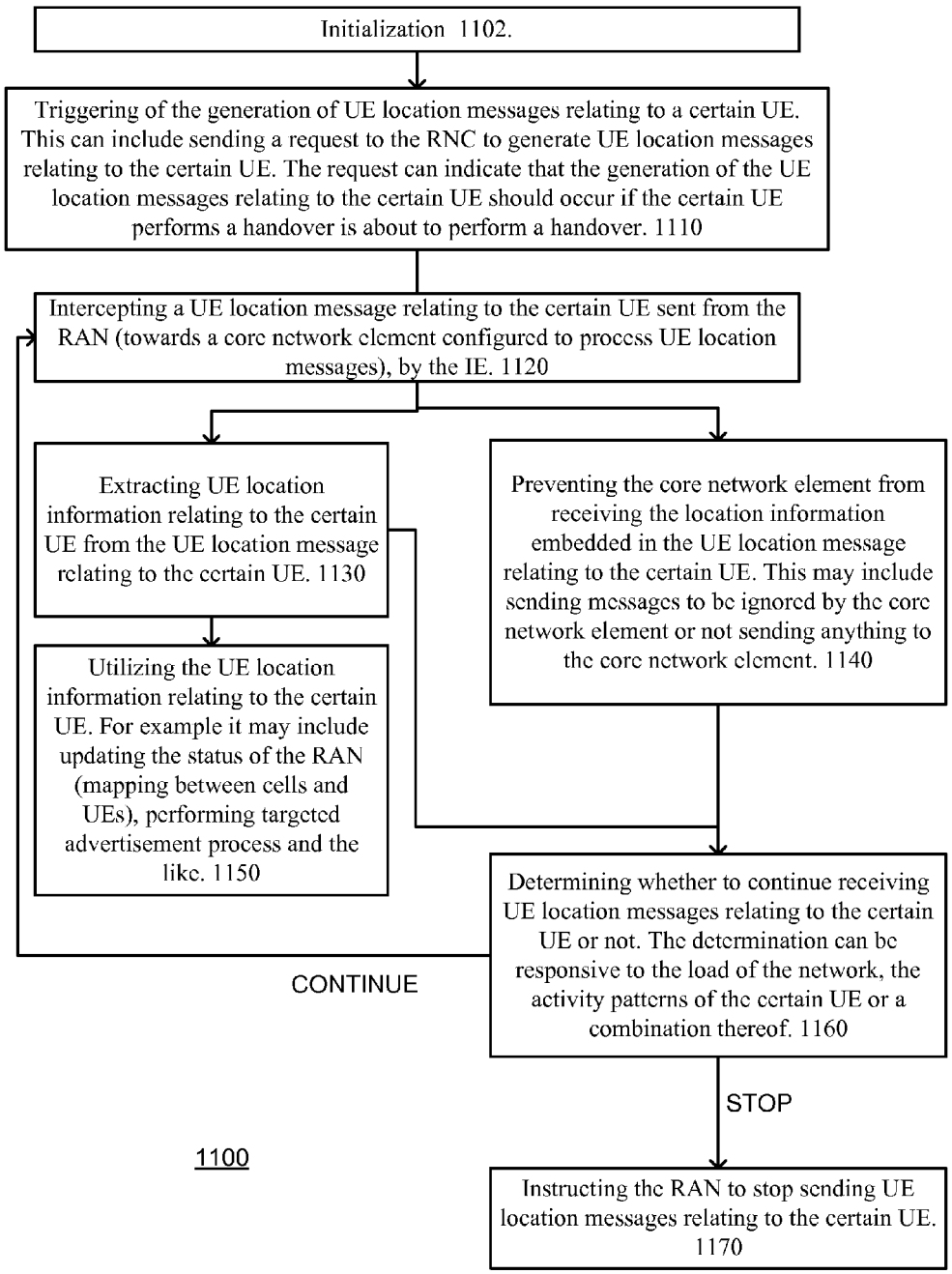
FIG. 8 illustrates a method according to an embodiment of the invention.

FIG. 8 illustrates method 1100 according to an embodiment of the invention.

The method 1100 is aimed for gathering user equipment (UE) location information from a radio access network (RAN).

Method 1100 may start by initialization stage 1102. During this state the intermediate can gather information that will allow it to communicate with the RAN and/or the core network element.

Stage 1102 may include extracting identification information from control messages exchanged between the RAN and the core network element. This identification information may be utilized to emulate the core element to the RAN.

Stage 1102 may include extracting at least one out of a SCTP stream identifier and a SCCP connection identifier.

Stage 1102 may be followed by stage 1110 of triggering of the generation of UE location messages relating to a certain UE. This can include sending a request to the RNC to generate UE location messages relating to the certain UE. The request can indicate that the generation of the UE location messages relating to the certain UE should occur if the certain UE performs a handover is about to perform a handover.

Stage 1110 may be followed by stage 1120 of intercepting a UE location message relating to the certain UE sent from the RAN (towards a core network element configured to process UE location messages), by the IE.

Stage 1120 may be followed by stages 1130 and 1140.

Stage 1130 may include extracting UE location information relating to the certain UE from the UE location message relating to the certain UE.

Stage 1140 may include preventing the core network element from receiving the location information embedded in the UE location message relating to the certain UE. This may include sending messages to be ignored by the core network element or not sending anything to the core network element.

Stage 1140 may include preventing any UE location message to arrive to the core network element.

Stage 1130 may be followed by stage 1150 of utilizing the UE location information relating to the certain UE. For example it may include updating the status of the RAN (mapping between cells and UEs), performing targeted advertisement process and the like.

Stage 1130 and 1140 may be followed by stage 1160 of determining whether to continue receiving UE location messages relating to the certain UE or not. The determination can be responsive to the load of the network, the activity patterns of the certain UE or a combination thereof.

For example, stage 1160 can include determining to stop receiving UE location messages relating to the certain UE if the certain UE is inactive during a predetermined period (for example—few minutes, 10 minutes, 20 minutes and the like). The length of the predetermined period can be fixed or set in relation to the load imposed on the RAN, the core network, the IE and the like.

If it determined to continue receiving such messages then stage 1160 is followed by stage 1120. Else—stage 1160 is followed by stage 1170.

Stage 1170 may include instructing the RAN to stop sending UE location messages relating to the certain UE.

Stages 1120 and 1170 may include emulating, by the intermediate entity, the core network element, to the RAN. Thus, the RAN will not notice that it communicated with the IE and not with the core network element.

Figure 9:
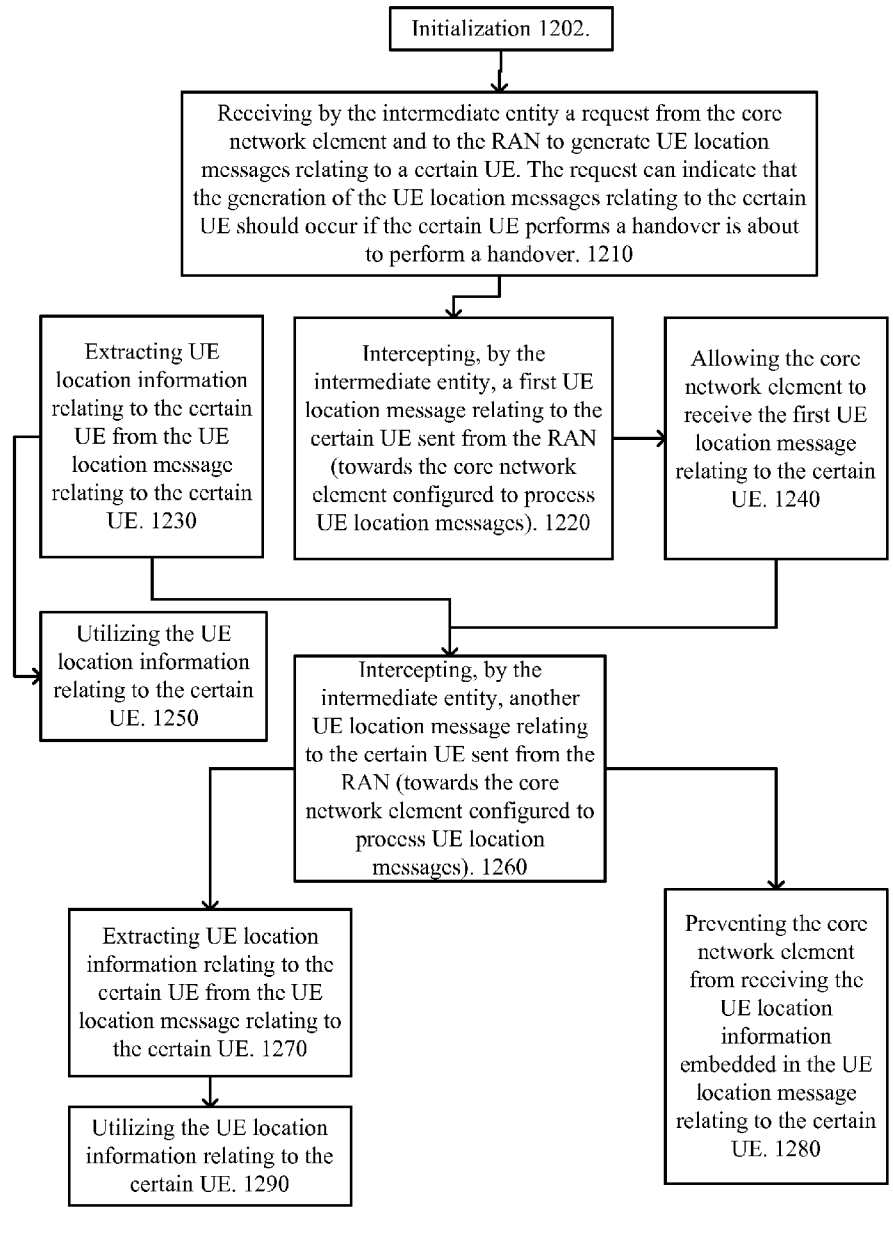
FIG. 9 illustrates a method according to an embodiment of the invention.

FIG. 9 illustrates method 1200 according to an embodiment of the invention.

The method 1200 is aimed for gathering user equipment (UE) location information from a radio access network (RAN).

Method 1200 may start by initialization stage 1202. During this state the intermediate can gather information that will allow it to communicate with the RAN and/or the core network element.

Stage 1202 may include extracting identification information from control messages exchanged between the RAN and the core network element. This identification information may be utilized to emulate the core element to the RAN.

Stage 1202 may include extracting at least one out of a SCTP stream identifier and a SCCP connection identifier.

Stage 1202 may be followed by stage 1210 of receiving by the intermediate entity a request from the core network element and to the RAN to generate UE location messages relating to a certain UE. The request can indicate that the generation of the UE location messages relating to the certain UE should occur if the certain UE performs a handover is about to perform a handover.

Stage 1210 is followed by stage 1220 of intercepting, by the intermediate entity, a first UE location message relating to the certain UE sent from the RAN (towards the core network element configured to process UE location messages).

Stage 1220 may be followed by stages 1230 and 1240.

Stage 1230 may include extracting UE location information relating to the certain UE from the UE location message relating to the certain UE.

Stage 1240 may include allowing the core network element to receive the first UE location message relating to the certain UE.

Stage 1230 may be followed by stage 1250 of utilizing the UE location information relating to the certain UE. For example it may include updating the status of the RAN (mapping between cells and UEs), performing targeted advertisement process and the like.

Stages 1230 and 1240 may be followed by stage 1260 of intercepting, by the intermediate entity, another UE location message relating to the certain UE sent from the RAN (towards the core network element configured to process UE location messages).

This core network element can be the SGSN but this is not necessarily so.

Stage 1260 may be followed by stages 1270 and 1280.

Stage 1270 may include extracting UE location information relating to the certain UE from the UE location message relating to the certain UE.

Stage 1280 may include preventing the core network element from receiving the UE location information embedded in the UE location message relating to the certain UE. This may include sending messages to be ignored by the core network element or not sending anything to the core network element.

Stage 1280 may include preventing any UE location message to arrive to the core network element.

Stage 1270 may be followed by stage 1290 of utilizing the UE location information relating to the certain UE. For example it may include updating the status of the RAN (mapping between cells and UEs), performing targeted advertisement process and the like.

Stage 1280 and 1270 may be followed by stage 1260.

Stages 1220 and 1260 may include emulating, by the intermediate entity, the core network element, to the RAN. Thus— the RAN will not notice that it communicated with the IE and not with the core network element.

Stages 1220 and 1260 may include utilizing a connection established between the core network element and the RAN and re-stamping transmission sequence numbers associated with the connection.

Although method 1200 is illustrated as allowing the transmission of only the first UE location message relating to the certain UE from reaching the core network element this is not necessarily so and the core network can receive all or a subset of any UE location message relating to the certain UE.

It is noted that a combination of methods 1100 and 1200 can be provided. The intermediate entity can be configured to operate in any mode out of multiple modes (such as location reports transparent proxy mode, location reports proxy mode and the like).

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for gathering user equipment (UE) location information from a radio access network (RAN), the method comprises:
    intercepting a UE location message sent from the RAN towards a core network element configured to process UE location messages, wherein the intercepting is executed by an intermediate entity positioned between the RAN and the core network element;
    extracting UE location information from the UE location message; and
    preventing the core network element from receiving the location information embedded in the UE location message.

2. The method according to claim 1, wherein the core network element is an SGSN.

3. The method according to claim 1, comprising triggering the RAN, by the intermediate entity, generation of multiple UE location messages relating to a certain UE.

4. The method according to claim 3, comprising instructing the RAN to stop sending UE location messages relating to the certain UE if the certain UE is inactive during a predetermined period.

5. The method according to claim 3, wherein the preventing comprises preventing any UE location message to arrive to the core network element.

6. The method according to claim 3, comprising emulating, by the intermediate entity, the core network element, to the RAN.

7. The method according to claim 6, comprising:
    extracting identification information from control messages exchanged between the RAN and the core network element; and
    utilizing the identification information during the emulating of the core element to the RAN.

8. The method according to claim 7, wherein the extracting comprises extracting at least one out of a SCTP stream identifier and a SCCP connection identifier.

9. The method according to claim 1, comprising utilizing a connection established between the core network element and the RAN and re-stamping transmission sequence numbers associated with the connection.

10. The method according to claim 1, comprising updating a status of the RAN in response to the UE location information.

11. The method according to claim 1, comprising allowing the core element network to receive only the first UE location message related to a certain UE out of multiple UE location information massages related to the certain UE; wherein a generation of the multiple UE location messages was triggered by the core element network.

12. The method according to claim 1, comprising allowing the core element network to receive only a subset of multiple UE location information massages related to the certain UE; wherein a generation of the multiple UE location messages was triggered by the core element network.

13. A non-transitory computer readable medium that stores instructions which when executed by a computer causes the computer to perform steps of:
    intercepting a user equipment (UE) location message sent from a radio access network (RAN) towards a core network element configured to process UE location messages, wherein the intercepting is executed by an intermediate entity positioned between the RAN and the core network element;
extracting UE location information from the UE location message; and
preventing the core network element from receiving the location information embedded in the UE location message.

14. The non-transitory computer readable medium according to claim 13, wherein the core network element is an SGSN.

15. The non-transitory computer readable medium according to claim 13, storing instructions for triggering the RAN, by the intermediate entity, generation of multiple UE location messages relating to a certain UE.

16. The non-transitory computer readable medium according to claim 15, storing instructions for instructing the RAN to stop sending UE location messages relating to the certain UE if the certain UE is inactive during a predetermined period.

17. The non-transitory computer readable medium according to claim 15, storing instructions for preventing any UE location message to arrive to the core network element.

18. The non-transitory computer readable medium according to claim 15, storing instructions for emulating, by the intermediate entity, the core network element, to the RAN.

19. The non-transitory computer readable medium according to claim 18, storing instructions for:
extracting identification information from control messages exchanged between the RAN and the core network element; and
utilizing the identification information during the emulating of the core element to the RAN.

20. The non-transitory computer readable medium according to claim 19, storing instructions for extracting at least one out of a SCTP stream identifier and a SCCP connection identifier.

21. The non-transitory computer readable medium according to claim 13, storing instructions for utilizing a connection established between the core network element and the RAN and re-stamping transmission sequence numbers associated with the connection.

22. The non-transitory computer readable medium according to claim 13, storing instructions for updating a status of the RAN in response to the UE location information.

23. The non-transitory computer readable medium according to claim 13, storing instructions for allowing the core element network to receive only the first UE location message related to a certain UE out of multiple UE location information massages related to the certain UE; wherein a generation of the multiple UE location messages was triggered by the core element network.

24. The non-transitory computer readable medium according to claim 13, storing instructions for allowing the core element network to receive only a subset of multiple UE location information massages related to the certain UE; wherein a generation of the multiple UE location messages was triggered by the core element network.

* * * * *